United States Patent
Ou et al.

(10) Patent No.: US 10,287,004 B2
(45) Date of Patent: May 14, 2019

(54) TRANSFORMABLE AERIAL VEHICLE

(71) Applicant: SZ DJI TECHNOLOGY CO., LTD., Shenzhen (CN)

(72) Inventors: Di Ou, Shenzhen (CN); Wenlong Liang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 315 days.

(21) Appl. No.: 15/389,087

(22) Filed: Dec. 22, 2016

(65) Prior Publication Data

US 2017/0101174 A1 Apr. 13, 2017

Related U.S. Application Data

(63) Continuation of application No. PCT/CN2014/080892, filed on Jun. 26, 2014.

(51) Int. Cl.
| | |
|---|---|
| *B64C 27/08* | (2006.01) |
| *B64C 39/02* | (2006.01) |
| *B64D 47/08* | (2006.01) |

(52) U.S. Cl.
CPC ............ *B64C 27/08* (2013.01); *B64C 39/024* (2013.01); *B64D 47/08* (2013.01); *B64C 2201/027* (2013.01); *B64C 2201/108* (2013.01); *B64C 2201/146* (2013.01)

(58) Field of Classification Search
CPC . B64C 27/08; B64C 39/024; B64C 2201/027; B64C 2201/042; B64C 2201/088; B64C 2201/108; B64C 2201/123
See application file for complete search history.

(56) References Cited

U.S. PATENT DOCUMENTS

| | | | |
|---|---|---|---|
| 5,092,539 A | 3/1992 | Caero | |
| 2005/0178896 A1* | 8/2005 | Cylinder | B64C 33/02 244/72 |
| 2010/0150719 A1 | 6/2010 | Waide et al. | |

FOREIGN PATENT DOCUMENTS

| | | |
|---|---|---|
| CN | 201793018 U | 4/2011 |
| CN | 102649476 A | 8/2012 |
| CN | 103144767 A | 6/2013 |
| CN | 103277266 A | 9/2013 |
| CN | 203306225 U | 11/2013 |
| CN | 103786878 A | 5/2014 |
| GB | 273496 A | 7/1927 |
| GB | 442016 A | 1/1936 |
| GB | 499632 A | 1/1939 |

OTHER PUBLICATIONS

The World Intellectual Property Organization (WIPO) International Search Report for PCT/CN2014/080892 dated Sep. 26, 2014 p. 1-6.

* cited by examiner

*Primary Examiner* — Richard G Davis
(74) *Attorney, Agent, or Firm* — Anova Law Group, PLLC (57) ABSTRACT

A transformable aerial vehicle includes a fuselage and a body frame. The fuselage includes a transmission mechanism including a leadscrew, at least two nuts threadedly connected to the leadscrew and connected to each other, and a nut adapter sleeved on one of the at least two nuts. The body frame includes a main support arm connected to the nut adapter, a crossbar connected to the main support arm, and a rotary power mechanism mounted on the crossbar.

20 Claims, 6 Drawing Sheets

TRANSFORMABLE AERIAL VEHICLE

CROSS-REFERENCE TO RELATED APPLICATION

This is a continuation application of International Application No. PCT/CN2014/080892, filed on Jun. 26, 2014, the entire contents of which are incorporated herein by reference.

TECHNICAL FIELD

The present disclosure generally relates to aerial vehicles, and particularly, to a transformable aerial vehicle.

BACKGROUND

In the field of aerial photography, miniature aerial vehicles, particularly four-rotor aircraft, can perform tasks such as surveillance and reconnaissance at a low altitude (such as indoors, in urban areas, and woodland etc.), and have a broad prospect of military and civilian uses. In addition, they have become a new international research focus because of their novel appearance, simple structure, low cost, excellent performance, and unique way of flight control.

The fuselage of a conventional aerial vehicle is usually a rigid structure. However, the fuselage of a transformable aerial vehicle is designed to have a lot of hinges such that the dynamic stiffness is deteriorated. Therefore, it is currently an issue in the industry to improve the dynamic stiffness of the transformable aerial vehicle.

SUMMARY

The present disclosure provides a transformable aerial vehicle which has an improved dynamic stiffness.

In accordance with the present disclosure, there is provided a transformable aerial vehicle including a fuselage and a body frame. The fuselage includes a transmission mechanism including a leadscrew, at least two nuts threadedly connected to the leadscrew and connected to each other, and a nut adapter sleeved on one of the at least two nuts. The body frame includes a main support arm connected to the nut adapter, a crossbar connected to the main support arm, and a rotary power mechanism mounted on the crossbar.

In some embodiments, the transformable aerial vehicle further includes a nut extension. The at least two nuts include a first nut and a second nut sleeved in the nut extension and connected to each other by the nut extension.

In some embodiments, the nut extension includes a first stepped hole at an upper and a second stepped hole at a lower end. The first nut is sleeved in the first stepped hole. The second nut is sleeved in the second stepped hole.

In some embodiments, the fuselage further includes a center rest including a top beam, a chassis, and a support bracket connected between the top beam and the chassis. The fuselage also includes a steering engine arranged on the top beam. The transmission mechanism is mounted in the center rest. One end of the transmission mechanism is connected to the steering engine, and another end of the transmission mechanism is slidably connected to the chassis.

In some embodiments, the transformable aerial vehicle further includes at least two dirt-proof boots each corresponding to one of the at least two nuts and being sleeved on the leadscrew and between the corresponding nut and the center rest of the fuselage.

In some embodiments, one of the at least two dirt-proof boots is abutted between the first nut and the top beam of the center rest, and another one of the at least two dirt-proof boots is abutted between the second nut and the chassis of the center rest.

In some embodiments, the transformable aerial vehicle further includes a main support arm end joint connecting one end of the main support arm to the center rest, and a nut split connecting rod connecting the one end of the main support arm to the nut adapter. Another end of the main support arm is connected to the crossbar.

In some embodiments, the main support arm end joint includes a coupling end and a fixing end perpendicular to each other. The coupling end is connected to the center rest and the fixing end is sleeved on the main support arm.

In some embodiments, the transformable aerial vehicle further includes an adhesive provided in a juncture at which the fixing end of the main support arm end joint is sleeved with the main support arm.

In some embodiments, the transformable aerial vehicle further includes a crossbar connector connecting the other end of the main support arm to a middle portion of the crossbar. The main support arm is perpendicular to the crossbar.

In some embodiments, the transformable aerial vehicle further includes an adhesive provided in junctures at which the crossbar connector sleeves with the main support arm and the crossbar, respectively.

In some embodiments, the rotary power mechanism is a first rotary power mechanism. The body frame further includes a second rotary power mechanism. The first and second rotary power mechanisms are mounted at a front end and a rear end of the crossbar, respectively.

In some embodiments, the body frame is a first body frame. The transformable aerial vehicle further includes a second body frame. The first and second body frames are arranged on two sides of the fuselage, respectively.

In some embodiments, the main support arm is a first main support arm, the crossbar is a first crossbar, and the rotary power mechanism is a first rotary power mechanism. The first body frame further includes a second rotary power mechanism. The first and second rotary power mechanisms are mounted at a front end and a rear end of the first crossbar, respectively. The second body frame includes a second main support arm connected to the transmission mechanism, a second crossbar connected to the second main support arm, and a third rotary power mechanism and a fourth rotary power mechanism mounted at a front end and a rear end of the second crossbar, respectively.

Also in accordance with the present disclosure, there is provided 1 transformable aerial vehicle including a center rest, a transmission mechanism mounted in the center rest, and two main support arms respectively disposed on opposite sides of the center rest. Each main support arm includes a main support arm end joint disposed on an end of the corresponding main support arm. The main support arm end joints of the two main support arms are rotatably connected to each other. The transmission mechanism comprising a leadscrew, at least two nuts threadedly connected to the leadscrew and connected to each other, and a nut adapter coupled to one of the at least two nuts. Each main support arm end joint is rotatably connected to the nut adapter by a nut split connecting rod.

In some embodiments, two adjoining nuts are connected to each other by a nut extension.

In some embodiments, the transformable aerial vehicle further includes a steering engine installed on the center rest and configured to drive the leadscrew.

In some embodiments, the transmission mechanism further includes a dirt-proof boot sleeved on the leadscrew to prevent dust and dirt from falling on the leadscrew and affecting the engagement of the leadscrew and the nuts.

In some embodiments, the nut adapter is sleeved on a main body of the nut and is configured to move as the nut moves up and down when a rotation of the leadscrew is converted to a linear motion of the nut.

In some embodiments, another end of each main support arm is connected to a middle portion of a crossbar. Opposite ends of the crossbar support at least one rotary power mechanism.

The transformable aerial vehicle of the disclosure uses two nuts to replace a ball nut to cooperate with the leadscrew to offset the fitting clearance between the nuts and the leadscrew. This allows the nuts to move along the leadscrew without shaking or vibrating, thereby increasing the overall dynamic stiffness and meeting the dynamic stiffness requirement of the transformable aerial vehicle during transformation or flight, improving the flight performance and reducing cost.

BRIEF DESCRIPTION OF THE DRAWINGS

The present disclosure is illustrated by way of embodiments and accompanying drawings.

DETAILED DESCRIPTION

The present disclosure is described below by way of embodiments and accompanying drawings. An exemplary embodiment is illustrated in the drawings. However, a transformable aerial vehicle consistent with the present disclosure can be implemented in many different ways and is not restricted by embodiments described in the present disclosure. The embodiments provided in this disclosure are merely an indication of a more comprehensive disclosure.

Figure 1:
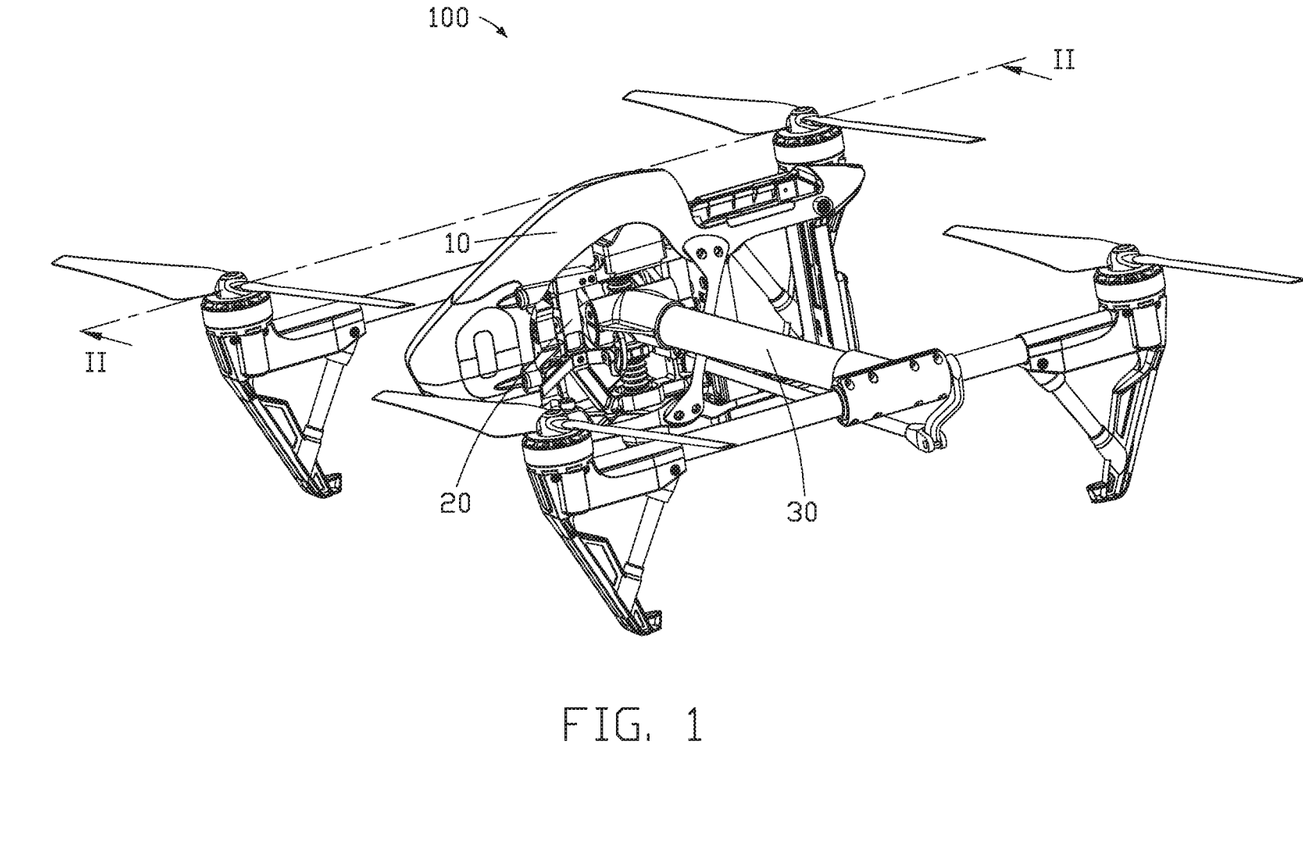
FIG. 1 is a schematic perspective view of a transformable aerial vehicle in accordance with one embodiment of the present disclosure.
Figure 2:
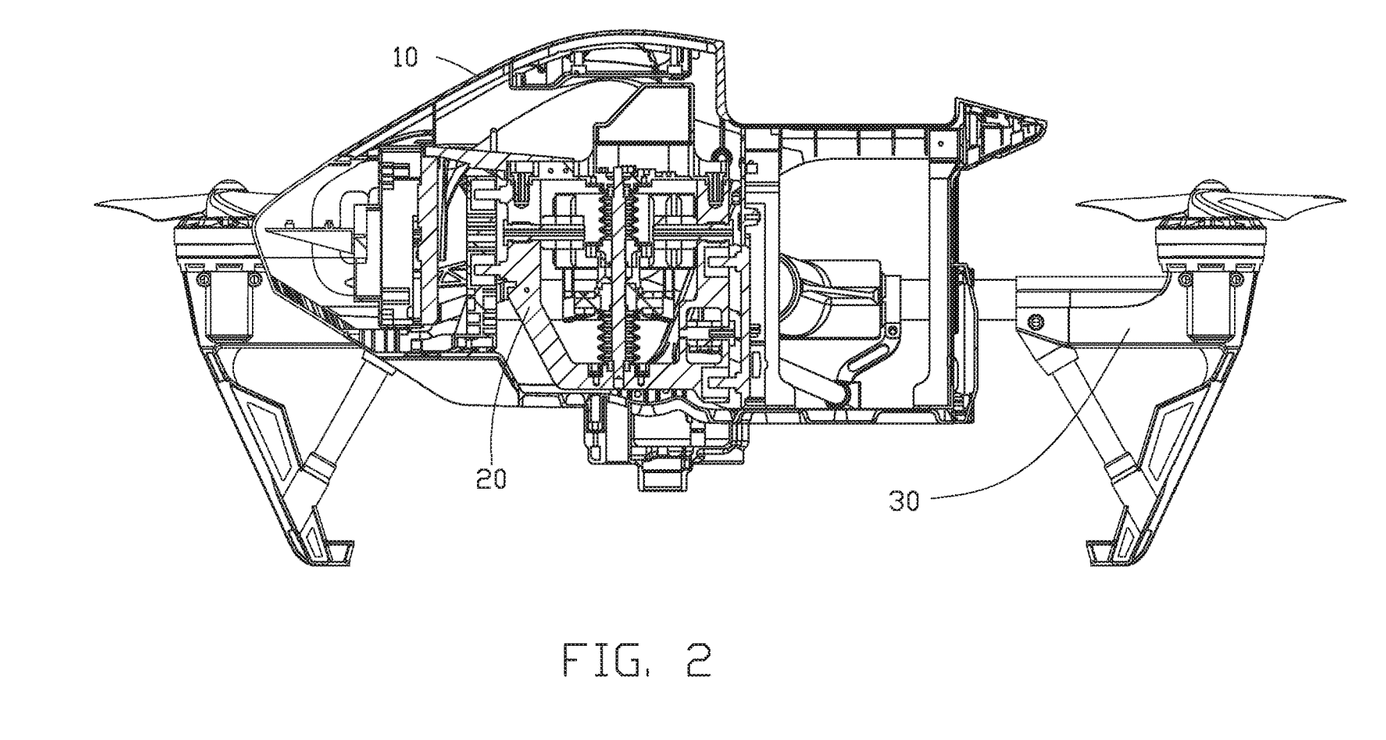
FIG. 2 is a cross-sectional view of the vehicle along II-II line of FIG. 1.

Referring to FIG. 1 and FIG. 2, a transformable aerial vehicle 100 can carry an accessory (such as a camera, a mechanical arm, etc.) to perform a specific task (such as surveillance, reconnaissance, operations aloft, etc.). In the present embodiment, the transformable aerial vehicle 100 can be, for example, a remotely-controlled miniature aerial vehicle.

The transformable aerial vehicle 100 includes a housing 10, a fuselage 20, and a body frame 30. The fuselage 20 is installed in the housing 10. The body frame 30 is connected to the fuselage 20. A direction and angle of the body frame 30 can be adjusted by controlling the fuselage 20. The body frame 30 extends outside of the housing 10.

Figure 3:
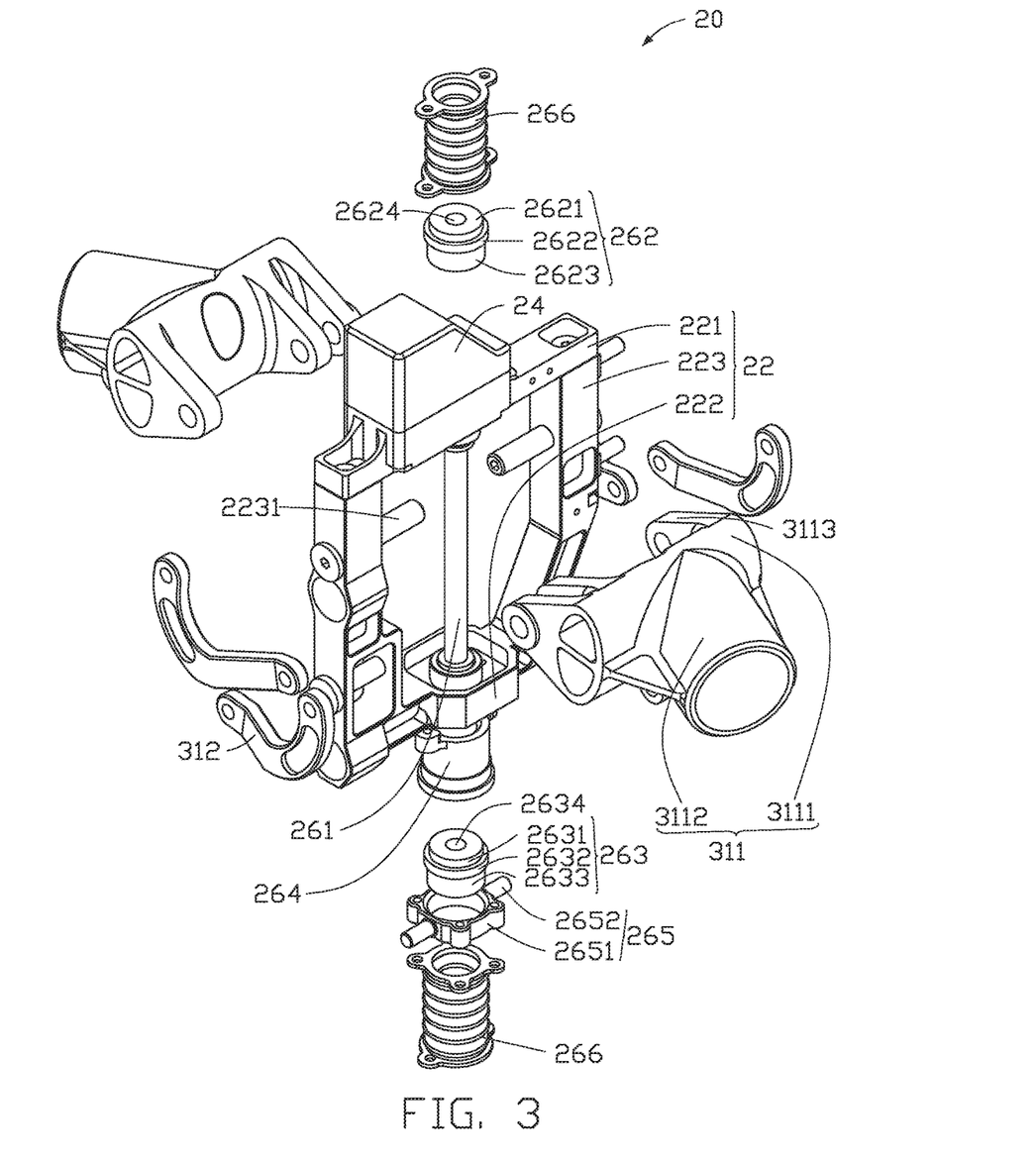
FIG. 3 is an enlarged exploded view of the fuselage of the vehicle shown in FIG. 1.
Figure 5:
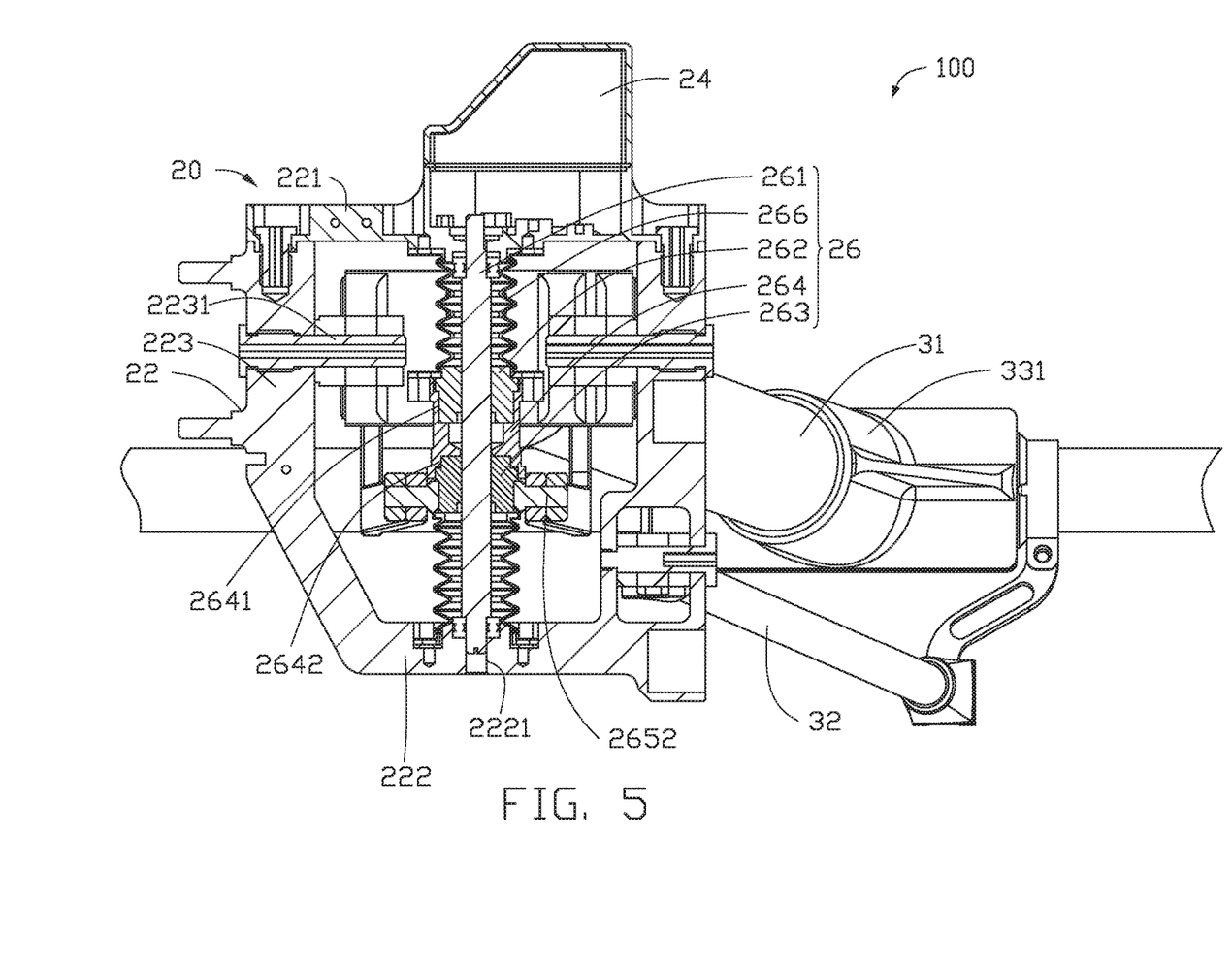
FIG. 5 is an enlarged cross-sectional view of the fuselage and the frame structure of the vehicle along line V-V of FIG. 4.
Figure 6:
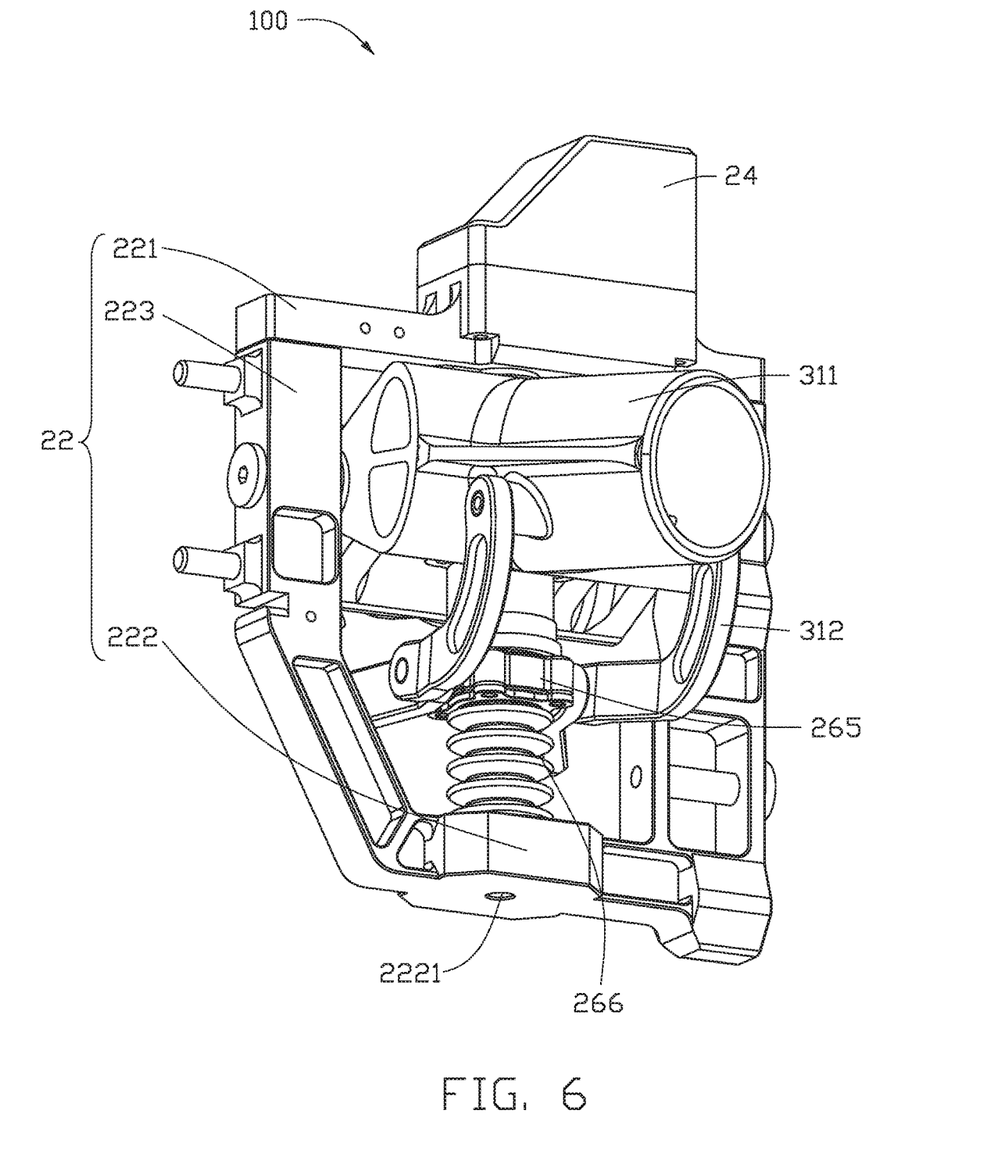
FIG. 6 is an assembled view of the fuselage of the vehicle shown in FIG. 3.

As shown in FIG. 3, FIG. 5, and FIG. 6, the fuselage 20 includes a center rest 22, a steering engine 24, and a transmission mechanism 26. The center rest 22 is fixed inside the housing 10. The center rest 22 includes a substantially rectangular frame. The center rest 22 includes a top beam 221, a chassis 222, and a support bracket 223 connected between the top beam 221 and the chassis 222. Several screws 2231 can be insertion-mounted on the support bracket 223. In the present embodiment, two screws 2231 are provided, which are mounted on the support bracket 223. The two screws 2231 are inserted in the support bracket 223 from the outside of the center rest 22 towards the inside of the center rest 22, and are arranged coaxially and opposite to each other. The screws 2231 are exposed in the interior of the center rest 22 for parts of the body frame 30 to be connected to and fixed on the center rest 22. The steering engine 24 is installed on the top beam 221 of the center rest 22, and is connected to the transmission mechanism 26 to drive the transmission mechanism 26. The transmission mechanism 26 is mounted in the center rest 22. One end of the transmission mechanism 26 is connected to the steering engine 24, and the other end is slidably connected to the chassis 222. The chassis 222 is configured with a through-hole 2221 to connect to the transmission mechanism 26.

The transmission mechanism 26 includes a leadscrew 261, a first nut 262, a second nut 263, a nut extension 264, a nut adapter 265, and a dirt-proof boot 266. The nuts (including the first nut 262 and the second nut 263) are sleeved on the screw 261. The nut extension 264 is arranged between the first nut 262 and the second nut 263. The nut adapter 265 is connected to one of the nuts. The dirt-proof boot 266 is abutted between the nuts and the center rest 22. In some embodiments, at least two nuts are provided. In some embodiments, for example, three or four nuts are provided.

A periphery of the leadscrew 261 has an external thread. The top of the leadscrew 261 is fixedly connected to the steering engine 24 at the top of the fuselage 20. The steering engine 24 can drive the leadscrew 261 to rotate. The bottom end of the leadscrew 261 is inserted in the through-hole 2221 of the chassis 222 of the center rest 22. A diameter of the bottom end of the leadscrew 261 is substantially equal to the diameter of the through-hole 2221 to allow the bottom end of the leadscrew 261 to be received in the through-hole 2221. The leadscrew 261 can be entirely received in the center rest 22 and can be substantially in the middle of the center rest 22, so as to divide the center rest 22 substantially equally.

The first nut 262 and the second nut 263 are connected to the screw thread of the leadscrew 261. The first nut 262 and the second nut 263 can be made of plastic, and can have the same shape and size for mass production and cost reduction. The periphery of the first nut 262 includes three cylinders with different outer diameters and axial heights, i.e., a first head portion 2621, a first shoulder portion 2622, and a first main body 2623. Among these three cylinders, the first shoulder portion 2622 has the largest diameter, and the first main body 2623 has the greatest height. The center of the first nut 262 defines a first threaded hole 2624, which engages the screw thread of the leadscrew 261. The periphery of the second nut 263 includes three cylinders with different outer diameters and axial heights, i.e., a second head portion 2631, a second shoulder portion 2632, and a second main body 2633. Among these three cylinders, the second shoulder portion 2632 has the largest diameter, and the second main body 2633 has the greatest height. The center of the second nut 263 defines a second threaded hole 2634, which engages the screw thread of the leadscrew 261. In other embodiments, the external shapes of the first nut 262 and the second nut 263 can be different from those shown in the drawings and described above, such as in the shape of a polygon, etc.

In the present embodiment, the first nut 262 and the second nut 263 are spaced apart from each other, and both are sleeved within the nut extension 264 and connected by the nut extension 264. The first nut 262 is sleeved in an upper end of the nut extension 264, and the second nut 263 is sleeved in a lower end of the nut extension 264. Using two nuts instead of a ball nut to cooperate with the leadscrew 261 offsets the fitting clearance between the nuts themselves and the leadscrew 261. This allows the nuts to move along the leadscrew 261 without shaking or vibrating, thereby increasing an overall dynamic stiffness, meeting the dynamic stiffness requirement of the transformable aerial vehicle 100 during transformation or flight. The flight performance can be improved, and at the same time the cost can be reduced.

The nut extension 264 is substantially cylindrical. A top end and a bottom end of the nut extension 264 concave inwardly to form stepped holes, i.e., a first stepped hole 2641 and a second stepped hole 2642. The first stepped hole 2641 sleeves the first shoulder portion 2622 and the first main body 2623 of the first nut 262. The first main body 2623 forms an interference fit with the first stepped hole 2641. The second stepped hole 2642 sleeves the second head portion 2631 and the second shoulder portion 2632 of the second nut 263. The second head portion 2631 and the second shoulder portion 2632 can be held abutting inside the second stepped hole 2642. The nut extension 264 can connect the first nut 262 and the second nut 263, and can improve the surrounding of the leadscrew 261 by the nuts, which further offsets the fitting clearance between the nuts and the leadscrew 261 to allow the nuts to move along the leadscrew 261 without shaking.

The nut adapter 265 sleeves on the second main body 2633 of the second nut 263. When the rotation of the leadscrew 261 is converted to the linear motion of the second nut 263, the nut adapter 265 can move as the second nut 263 moves up and down. The nut adapter 265 includes a frame 2651 and side levers 2652. The shape of the frame 2651 corresponds to the shape of the second main body 2633 of the second nut 263, and the diameter of the frame 2651 corresponds to that of the second main body 2633 of the second nut 263. The frame 2651 can be circular to match and connect to the second main body 2633 of the second nut 263. The side levers 2652 are opposite to each other and extend outwardly from sides of the frame 2651 for connecting to the body frame 30.

In some embodiments, as shown in the drawings, two dirt-proof boots 266 are provided. One of the dirt-proof boots 266, also referred to as an "upper dirt-proof boot 266," is sleeved on an upper end of the first nut 262. In particular, the upper dirt-proof boot 266 is abutted between the first nut 262 and the top beam 221 of the center rest 22. The other dirt-proof boot 266, also referred to as a "lower dirt-proof boot 266," is sleeved on a lower end of the second nut 263. In particular, the lower dirt-proof boot 266 is abutted between the second nut 263 and the chassis 222 of the center rest 22. When the leadscrew 261 rotates, the rotation is converted into an up and down reciprocating motion of the first nut 262 and second nut 263. The lengths of the dirt-proof boots 266 at the top and bottom reduce or increase as a result of the linear motion of the first nut 262 and the second nut 263. Sleeving the dirt-proof boots 266 on the leadscrew 261 prevents dust and dirt from falling on the leadscrew 261 and affecting the engagement of the leadscrew 261 and nuts in the long run. Thus, the service life of the leadscrew 261 is greatly increased to guarantee the product life.

Figure 4:
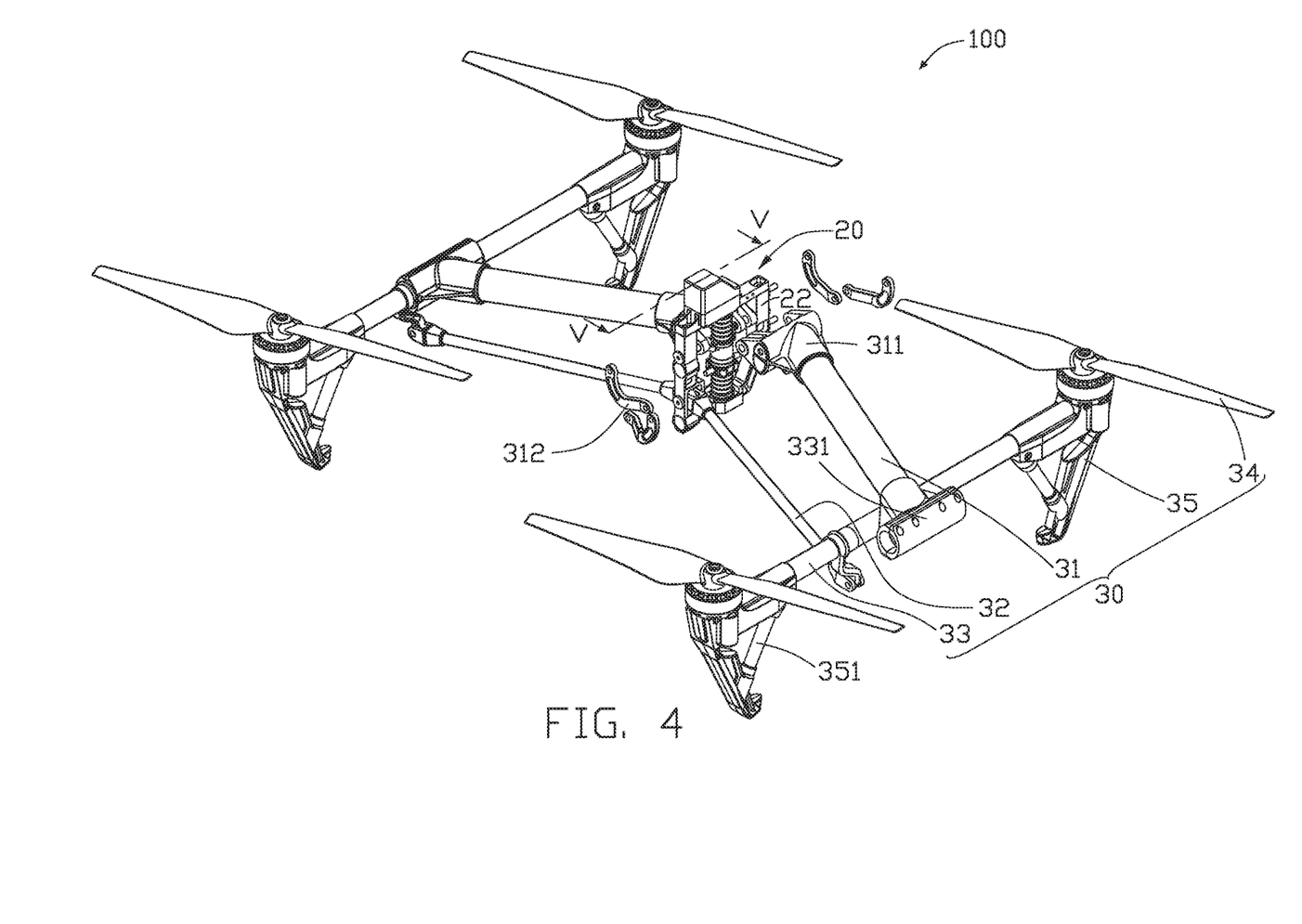
FIG. 4 is a perspective view of the fuselage and the frame structure of the vehicle shown in FIG. 1.

As shown in FIG. 4 and FIG. 5, two body frames 30 are provided symmetrically on the left and right sides of the transformable aerial vehicle 100. Each body frame 30 includes a main support arm 31, an auxiliary support arm 32, a crossbar 33, rotary power mechanisms 34, and undercarriages 35. The rotary power mechanisms 34 and undercarriages 35 are connected to the crossbar 33.

The main support arm 31 extends from one side of the housing 10 of the transformable aerial vehicle 100, and is connected to the fuselage 20 at the same side. In the present embodiment, one end of the main support arm 31 is connected to the center rest 22 of the fuselage 20 by a main support arm end joint 311. Specifically, the main support arm end joint 311 is in the form of a T-junction, including a coupling end 3111 and a fixing end 3112. In the present embodiment, the coupling end 3111 and the fixing end 3112 are perpendicular to each other, and connect plates 3113 are provided on the coupling end 3111. The two screws 2231 of the center rest 22 are inserted into the connect plates 3113 to rotatably connect the main support end joint 311 to the center rest 22. The fixing end 3112 sleeves the main support arm 31. The main support arm end joint 311 is also connected to the transmission mechanism 26 by two nut split connecting rods 312. Specifically, one end of a nut split connecting rod 312 is connected to the main support arm end joint 311, and the other end is connected to the nut adapter 265 of the transmission mechanism 26 by connecting to a side lever 2652. When the nut adapter 265 reciprocates under the driving of the leadscrew 261 of the transmission mechanism 26, one end of the nut split connecting rod 312 connected to the nut adapter 265 drive the other end connected to the main support arm end joint 311 to produce a linkage motion to drive the main support arm 31. In some embodiments, as shown in the drawings, two main support arm end joints 311 are provided. The two main support arm end joints 311 are connected to two sides of the center rest 22 and connected to each other by the screws 2231 described above. The two nut split connecting rods 312 are respectively connected to the two sides of the corresponding main support arm end joint 311. The shape of each nut split connecting rod 312 can be designed according to the actual movement required. In the present embodiment, each nut split connecting rod 312 is roughly sickle-shaped.

The other end of the main support arm 31 is connected to and fixed on the crossbar 33 by a crossbar connector 331. The crossbar connector 331, which is substantially in a T-junction shape, causes the main support arms 31 and the crossbar 33 to be perpendicular to each other. The main support arm 31 is connected to an approximately middle position of the crossbar 33. One end of the auxiliary support arms 32 is fixed on the center rest 22 of the fuselage 20 and the other end is fixed on the crossbar 33 to cooperate with the transformational movement of the main support arm 31.

Each of the crossbars 33 is connected to two rotary power mechanisms 34 and two undercarriages 35. One rotary power mechanism 34 and one undercarriage 35 are connected to a front end of the crossbar 33, and the other rotary power mechanism 34 and the other undercarriage 35 are connected to a rear end of the crossbar 33. Each pair of rotary power mechanism 34 and undercarriage 35 can be first integrated into an integral unit and then connected to one end of the crossbar 33, and the rotary power mechanism 34 is positioned above the corresponding undercarriage 35. In the present embodiment, each of the power mechanisms 34 and the undercarriages 35 is sleeved on one end of the crossbar 33. The undercarriage 35 is controlled by a hydraulic damping rod 351 to extend and retract. The hydraulic damping rod 351 can provide buffering to the transformable aerial vehicle 100 when the transformable aerial vehicle 100 lands. In the present embodiment, four power mechanisms 34 and four undercarriages 35 are provided.

Adhesive can be provided at junctures between adjoining structures on the body frame 30. In the present embodiment, adhesive material having a relatively good adhesive property is provided at junctures between the main support arm end joint 311 and the main support arm 31, between the crossbar connector 331 and the main support arm 31, between the crossbar connector 331 and the crossbar 33, between the rotary power mechanism 34 and the crossbar 33, and between the undercarriage 35 and the crossbar 33, to maintain the aesthetic apparel and avoid the problem of screw loosening caused by the vibration of the body frame 30.

The transformable aerial vehicle 100 of the disclosure uses two nuts to replace a ball nut to cooperate with the leadscrew 261 to offset the fitting clearance between the nuts and the leadscrew 261. This allows the nuts to move along the leadscrew 261 without shaking or vibrating, thereby increasing the overall dynamic stiffness and meeting the dynamic stiffness requirement of the transformable aerial vehicle 100 during transformation or flight, improving the flight performance and reducing cost. Further, the nut extension 264 can connect the first nut 262 and the second nut 263, and also improve the surrounding of the leadscrew 261 by the nuts, which further offsets the fitting clearance between the nuts and the leadscrew 261 to allow the nuts move along the leadscrew 261 without shaking. In addition, the dirt-proof boots 266 are sleeved on the leadscrew 261 to prevent dust and dirt from falling on the leadscrew 261 and affecting the engagement of the leadscrew 261 and the nuts. Thus, the service life of the leadscrew 261 is greatly increased to guarantee the product life. Adhesive can be provided at junctures between adjoining structures on the body frame 30 to fix the adjoining structures, thereby maintaining the aesthetic apparel and avoiding the problem of screw loosening caused by the vibration of the body frame 30.

It is appreciated that the embodiments described above in detail are exemplary embodiments and are for illustrative purposes. The implementation of the present disclosure is not limited to these exemplary embodiments. One of ordinary skill in the art can make variations and equivalents having the same effects and applications without departing from the spirit of the present disclosure and such variations and equivalents are considered as within the scope of the present disclosure.

What is claimed is:

1. A transformable aerial vehicle, comprising:
    a fuselage comprising a transmission mechanism, the transmission mechanism comprising:
      a leadscrew;
      at least two nuts threadedly connected to the leadscrew and connected to each other; and
      a nut adapter sleeved on one of the at least two nuts; and
    a body frame comprising:
      a main support arm connected to the nut adapter;
      a crossbar connected to the main support arm; and
      a rotary power mechanism mounted on the crossbar.

2. The transformable aerial vehicle of claim 1, further comprising:
    a nut extension,
    wherein the at least two nuts comprise a first nut and a second nut sleeved in the nut extension and connected to each other by the nut extension.

3. The transformable aerial vehicle of claim 2, wherein:
    the nut extension includes a first stepped hole at an upper and a second stepped hole at a lower end,
    the first nut is sleeved in the first stepped hole, and
    the second nut is sleeved in the second stepped hole.

4. The transformable aerial vehicle of claim 2, wherein:
    the fuselage further comprises:
      a center rest comprising a top beam, a chassis, and a support bracket connected between the top beam and the chassis; and
      a steering engine arranged on the top beam, and
    the transmission mechanism is mounted in the center rest, one end of the transmission mechanism being connected to the steering engine, and another end of the transmission mechanism is slidably connected to the chassis.

5. The transformable aerial vehicle of claim 4, further comprising:
    at least two dirt-proof boots, each of the dirt-proof boots corresponding to one of the at least two nuts and being sleeved on the leadscrew and between the corresponding nut and the center rest of the fuselage.

6. The transformable aerial vehicle of claim 5, wherein one of the at least two dirt-proof boots is abutted between the first nut and the top beam of the center rest, and another one of the at least two dirt-proof boots is abutted between the second nut and the chassis of the center rest.

7. The transformable aerial vehicle of claim 4, further comprising:
    a main support arm end joint connecting one end of the main support arm to the center rest; and
    a nut split connecting rod connecting the one end of the main support arm to the nut adapter,
    wherein another end of the main support arm is connected to the crossbar.

8. The transformable aerial vehicle of claim 7, wherein the main support arm end joint comprises a coupling end and a fixing end perpendicular to each other, the coupling end being connected to the center rest and the fixing end being sleeved on the main support arm.

9. The transformable aerial vehicle of claim 8, further comprising:
    an adhesive provided in a juncture at which the fixing end of the main support arm end joint is sleeved with the main support arm.

10. The transformable aerial vehicle of claim 7, further comprising:
    a crossbar connector connecting the other end of the main support arm to a middle portion of the crossbar, the main support arm being perpendicular to the crossbar.

11. The transformable aerial vehicle of claim 10, further comprising:
    an adhesive provided in junctures at which the crossbar connector sleeves with the main support arm and the crossbar, respectively.

12. The transformable aerial vehicle of claim 1, wherein:
    the rotary power mechanism is a first rotary power mechanism,
    the body frame further comprises a second rotary power mechanism, and
    the first and second rotary power mechanisms are mounted at a front end and a rear end of the crossbar, respectively.

13. The transformable aerial vehicle of claim 1,
wherein the body frame is a first body frame,
the transformable aerial vehicle further comprising:
   a second body frame,
      wherein the first and second body frames are arranged on two sides of the fuselage, respectively.

14. The transformable aerial vehicle of claim 13, wherein:
the main support arm is a first main support arm, the crossbar is a first crossbar, and the rotary power mechanism is a first rotary power mechanism,
the first body frame further comprises a second rotary power mechanism, the first and second rotary power mechanisms being mounted at a front end and a rear end of the first crossbar, respectively, and
the second body frame comprises:
   a second main support arm connected to the transmission mechanism;
   a second crossbar connected to the second main support arm; and
   a third rotary power mechanism and a fourth rotary power mechanism mounted at a front end and a rear end of the second crossbar, respectively.

15. A transformable aerial vehicle, comprising:
a center rest;
a transmission mechanism mounted in the center rest; and
two main support arms respectively disposed on opposite sides of the center rest, each main support arm comprising a main support arm end joint disposed on an end of the corresponding main support arm, and the main support arm end joints of the two main support arms being rotatably connected to each other,
   wherein the transmission mechanism comprises a leadscrew, at least two nuts threadedly connected to the leadscrew and connected to each other, and a nut adapter coupled to one of the at least two nuts, each main support arm end joint being rotatably connected to the nut adapter by a nut split connecting rod.

16. The transformable aerial vehicle of claim 15, wherein two adjoining nuts are connected to each other by a nut extension.

17. The transformable aerial vehicle of claim 15, further comprising:
   a steering engine installed on the center rest and configured to drive the leadscrew.

18. The transformable aerial vehicle of claim 15, wherein the transmission mechanism further comprises a dirt-proof boot sleeved on the leadscrew to prevent dust and dirt from falling on the leadscrew and affecting the engagement of the leadscrew and the nuts.

19. The transformable aerial vehicle of claim 15, wherein the nut adapter is sleeved on a main body of the nut, and the nut adapter is configured to move as the nut moves up and down when a rotation of the leadscrew is converted to a linear motion of the nut.

20. The transformable aerial vehicle of claim 15, wherein another end of each main support arm is connected to a middle portion of a crossbar, opposite ends of the crossbar supporting at least one rotary power mechanism.

* * * * *